Nov. 20, 1923.
L. GREENSTEIN
1,474,963
FRAUD PREVENTION MEANS FOR CIGAR BOXES
Filed Dec. 14, 1921    2 Sheets-Sheet 1
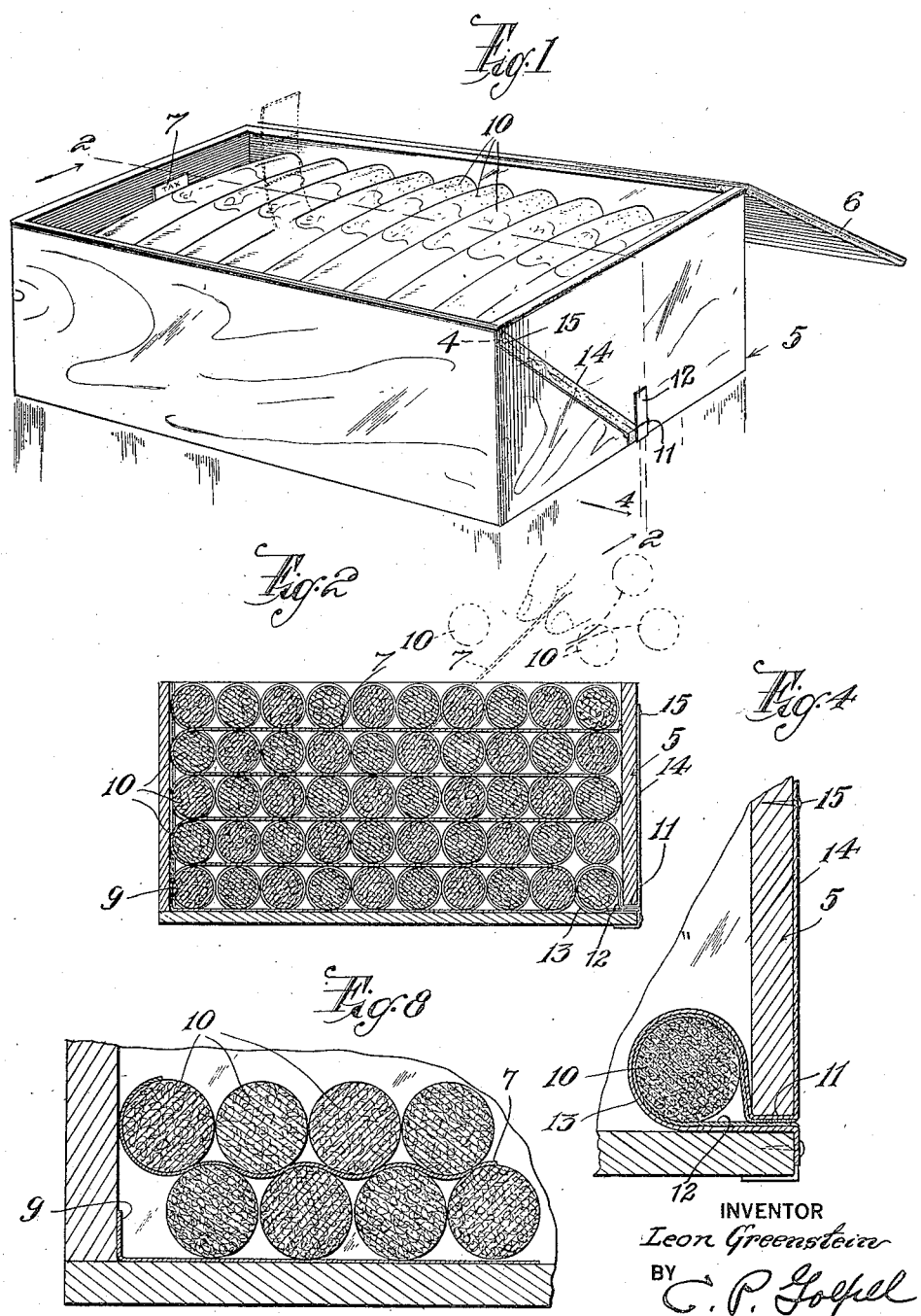
INVENTOR
Leon Greenstein
BY
ATTORNEY Nov. 20, 1923.  1,474,963
L. GREENSTEIN
FRAUD PREVENTION MEANS FOR CIGAR BOXES
Filed Dec. 14, 1921    2 Sheets-Sheet 2
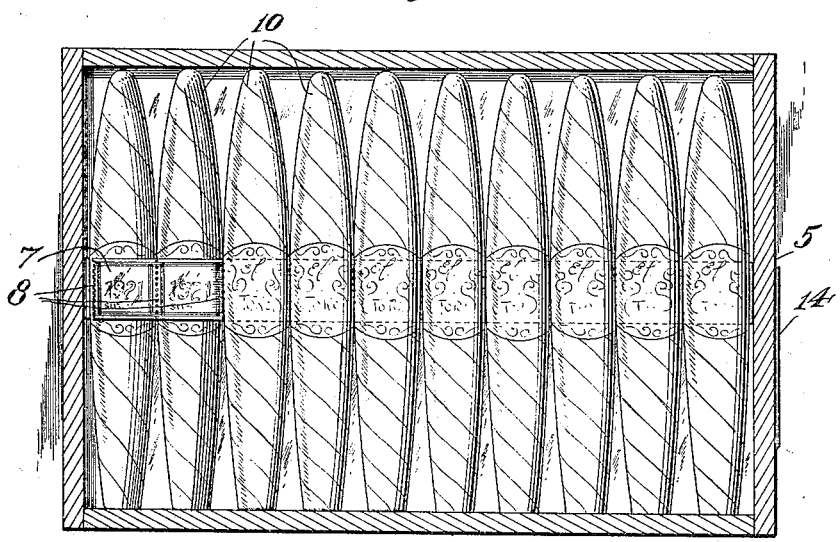
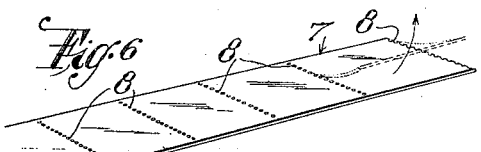
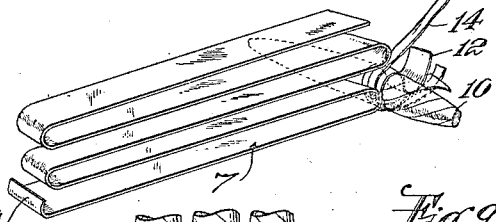
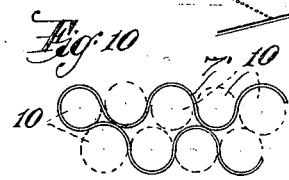
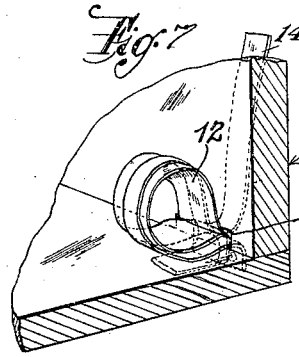
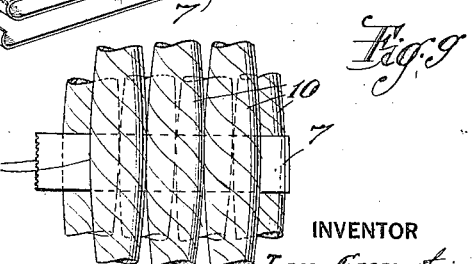
INVENTOR
Leon Greenstein
BY
C. P. Goepel
ATTORNEY Patented Nov. 20, 1923.

1,474,963

UNITED STATES PATENT OFFICE.

LEON GREENSTEIN, OF NEW YORK, N. Y.

FRAUD-PREVENTION MEANS FOR CIGAR BOXES.

Application filed December 14, 1921. Serial No. 522,213.

*To all whom it may concern:*

Be it known that I, LEON GREENSTEIN, a citizen of the United States, and a resident of New York city, borough of Manhattan, county and State of New York, have invented a certain new and useful Improvement in Fraud-Prevention Means for Cigar Boxes, of which the following is a specification.

This invention relates to fraud prevention means for cigar boxes and generically considered contemplates the provision of simple and effective means for preventing the refilling of boxes with cigars upon which no tax or duty has been paid, without detection.

More particularly, I propose to provide a perforated strip of tax stamps, fixed at one of its ends to a wall of the box and adapted to be extended between the rows of cigars as they are packed in superposed relation to each other within the box. Each of the stamps represents the tax on one cigar and as the cigars are removed, the exposed stamps at the end of the strip are torn off. If the box is re-filled with cigars upon which no tax has been paid, this fact will be evidenced to the Government inspectors by the absence of the strip of tax stamps.

In addition to the above, my invention also contemplates the provision of means for so applying and securing a tax stamp that its complete destruction is unavoidable in the removal of the last cigar from the box. At present the tax stamp for cigars is pasted over the edge of the box lid or cover and the front wall thereof. The retailer is supposed to destroy this stamp when all of the cigars have been sold. However, it is not uncommon for unscrupulous retailers to preserve the stamp and re-fill the box with cigars upon which no tax has been paid. I, therefore, propose to apply the stamp and secure the same to the box in such manner that in order to remove the last cigar from the box, not only must the stamp be destroyed so that it cannot again be used, but in order to remove the cigar without breaking the same, the box wall itself must be broken, thereby precluding the continued use of the box as a container for cigars.

It is a further general object of the invention to provide fraud prevention means for cigar boxes as above characterized which will not materially add to the cost of packing and marketing the cigars or involve the Government in any considerable additional outlay for the printing of the tax stamps.

With the above and other objects in view, the invention consists in the improved fraud prevention means which I shall hereinafter more fully describe, illustrate in the accompanying drawings and subsequently incorporate in the subjoined claims:

In the drawings wherein I have disclosed one satisfactory embodiment of the invention and in which similar reference characters designate corresponding parts throughout the several views, Figure 1 is a perspective view of an open cigar box having the invention applied thereto;

Fig. 2 is a section taken on the line 2—2 of Fig. 1;

Fig. 3 is a plan view, several of the cigars of the upper row having been removed;

Fig. 4 is an enlarged detail section taken on the line 4—4 of Fig. 1;

Fig. 5 is a perspective view showing the perforated tax strip and the means for securing the last cigar in the box;

Fig. 6 is a fragmentary perspective view of the perforated tax strip;

Fig. 7 is a sectional perspective view of a portion of the box illustrating the manner of securing the tax stamp around the last cigar in the box;

Figs. 8 and 9 are sectional and plan views respectively, illustrating the invention as applied to a slightly different arrangement or packing of the cigars in the box, and Fig. 10 is a detail view showing an alternative application of the perforated tax strip to the cigars arranged as shown in Fig. 8.

In the drawing I have shown a conventional cigar box or container having a capacity of fifty cigars. As is well known, such boxes are constructed of light wood, which is capable of being readily broken when any one of the box walls is struck a sharp blow. Along the rear upper edge of the body 5 of the box, the cover or lid 6 is hinged. When the box is filled with cigars, the cover is closed and usually tacked or nailed at its free edge to the front wall of the box body. A Government stamp is then applied over the meeting edges of the front wall and the cover, being gummed on one side to adhere to said walls. This stamp denotes the number of cigars contained in the box upon which the tax or duty has been paid. Obviously, in order to open the box the stamp must be cut or broken. The end portions of the stamp, however, are not mutilated and the tobacconist is, therefore, instructed that he should mutilate and destroy the two parts of the stamp with a knife or other means, but preferably he should break the box so that it cannot again be used. However, it is a common practice for retailers seeking to avoid payment of the tax, to preserve the stamp against mutilation and after the original contents of the box have been sold, to re-fill the box with cigars upon which no tax or duty has been paid.

It is the aim and purpose of my present invention to provide means which will operate to defeat the fraudulent practise above referred to so that the Government will receive the prescribed duty upon each cigar manufactured. To this end I propose to provide a strip of stamps 7 which are not gummed, the individual stamps being separated by the lines of perforations 8 extending transversely across the strip.

In packing the cigars in the box, one end of the stamp strip 7 is secured in any suitable manner as at 9 to one end wall of the box. The strip is then extended longitudinally over the bottom wall of the box, the first row of cigars indicated at 10, with the exception of the cigar next to the opposite end wall of the box from that to which the strip is attached, being laid upon the stamp strip. In the method of packing shown in Fig. 2, the stamp strip is returned over this first row of cigars. The next row is then laid in superposed relation upon the interposed portion of the stamp strip and the strip again reversed and extended over the said second row. The stamp strip is thus extended between the superposed rows of cigars until the upper or last row is laid upon the end portion of the strip. The end cigar in the bottom row which is not disposed upon the stamp strip is adapted to be confined in place by means which I shall presently describe in detail.

With the stamp strip arranged between the rows of cigars as above explained, when the retailer sells the cigars, as each cigar is removed one of the individual stamps is torn or detached from the strip along one of the perforated lines 8. The purchaser, of course, will observe whether or not the dealer fails to detach the stamp and the dealer fearing that the purchaser may be a Government inspector, would not fail to detach the stamp as any number of the stamps which remain visible and project beyond the upper row of cigars indicate the dealer's purpose to preserve the stamp strip so that it can be reused. Of course, it is not necessary for the cigars to be removed in successive order starting at one end of the row but the box may be presented to the customer to make his own selection and the removal of any one of the cigars will expose one of the stamps. The tax stamp strips can, of course, be purchased only from the Internal Revenue Office and after the individual stamps have been disconnected, it would not be possible to again connect said stamps in the form of a strip without detection.

In addition to the stamp strip above referred to, the box is also provided with the usual stamp indicating the number of cigars upon which the tax has been paid. This stamp, indicated at 12, is engaged around the medial portion of the end cigar in the bottom row which is not embraced by the stamp strip. The adjacent end wall of the box at its lower edge is provided with a recess or opening 11 through which the end portions of the stamp are adapted to be extended. The cigar together with the stamp is confined or tightly held by a ductile strip of metal 13, one end of which extends through the recess 12 and is fixed to the end edge of the bottom wall of the box. This metal strip is then extended around the box stamp and through the recess 12 and is then extended obliquely across the outer face of said end wall as at 14 to the front upper corner of the box and at this point is securely fixed by means of a nail 15 which is of sufficient length to extend through said end wall and into the front wall of the box. The ends of the stamp 11 are gummed and one end is extended upwardly over the part 14 of the metal strip and upon the face of the box wall and adhesively fixed thereto. The other end portion of the stamp is extended around the edge of the bottom wall and on the underside thereof. By securing the last cigar within the box in the manner just explained, it will be apparent that it will be a very difficult matter to release the cigar so that it might be removed without breakage. Thus it would be necessary to remove the nail 15 and thread the part 14 of the ductile metal strip through the recess 12, and if this were done, the tearing and destruction of the stamp 11 is assured so that it cannot again be used. However, the cigar might be more quickly removed by merely breaking out the end wall 5 and thus loosening the strip 14. Therefore, the box cannot be re-filled and again used as a container for cigars without the payment of the proper tax thereon.

From the foregoing description considered in connection with the accompanying drawings, it will be seen that the present invention operates very effectively to prevent the fraudulent re-filling of cigar boxes without detection, so that the Government will receive the legal tax on each cigar manufactured.

I have above referred to a particular means which I propose to use for the purpose of securing the last cigar in the bottom of the box against removal without destroying the box stamp which denotes the number of cigars contained in the box and upon which the tax has been paid. In this respect, however, it is possible to employ other alternative means for this purpose so that the invention is not necessarily limited in its application and use to the specific means herein described.

In Figure 8 of the drawings I have illustrated a different method of packing the cigars which is usually employed when twenty-five cigars are packed in the box or container. In this case, instead of arranging the cigars in superposed rows and in vertical alignment with each other, the cigars in one row are staggered with relation to the cigars in the adjacent rows. In such an arrangement of the cigars, the strip of individual tax stamps may be arranged between the rows of cigars in the same manner as shown in Figure 2 when fifty cigars are packed in a box.

However, in connection with the method of packing illustrated in Figure 8, it is also possible to use a slightly different arrangement of the strip of tax stamps. Thus, as shown in Figure 10, the stamp strip 7' may be extended between the adjacent cigars in the same row, passing alternately over and under the individual cigars. Any other preferred arrangement of the strip of individual tax stamps might be adopted, the essential consideration being that each cigar shall be associated with an individual tax stamp which is exposed to view when the cigar is removed from the box.

Numerous refinements, other than those herein particularly referred to, might likewise be adapted in accomplishing the purposes of the present invention. Accordingly, the privilege is reserved of resorting to all such legitimate changes and modifications as may be fairly considered within the spirit and scope of the appended claims.

I claim:

1. In combination with a cigar box, means for insuring the destruction of the tax payment indicating stamp comprising a ductile metal strip adapted for engagement over a tax stamp surrounding one of the cigars in the box, the ends of said metal strip being secured to the box walls and confining the cigar within the box, parts of the tax stamp being secured to the box walls over said strip whereby the detachment of said strip to permit of the removal of the cigar from the box will insure the destruction of the stamp.

2. Fraud prevention means for taxable commodities adapted to be packed in a container comprising means packed with the articles and indicative of the tax payment on the individual article, said means being normally concealed from view and removable with the individual articles from the container, and an additional tax stamp denoting the number of articles upon which the tax has been paid engaged around one of said articles to confine the same in the container, parts of the stamp being affixed to the container and necessitating the destruction of said stamp in order to remove the article from the container.

3. Fraud preventing means for taxable commodities adapted to be packed in a container comprising a tax stamp denoting the number of articles in the container upon which the tax has been paid, said stamp being associated with one of said articles to confine the same in the container and having its end portions fixed to walls of the container to thereby necessitate the destruction of said stamp in order to effect the removal of said article from the container.

4. Fraud prevention means for taxable commodities adapted to be packed in a container comprising, in combination with a container having a slot in one wall thereof, a tax stamp denoting the number of articles contained in the container upon which the tax has been paid surrounding one of said articles and having its end portions extended through the slot in the container wall and secured to the exterior surfaces of the container walls, the removal of said article from the container necessitating the destruction or mutilation of the tax stamp to such an extent as to prevent its re-use.

5. Fraud prevention means for taxable commodities adapted to be packed in a container comprising, in combination with the container having a slot in one wall thereof, a tax stamp denoting the number of articles in the container upon which the tax has been paid surrounding one of said articles and confining the same in the container, a ductile metal strip also extending around the article over the tax stamp, the end portions of said stamp and the metal strip extending through the slot in the container wall and being secured to the exterior surfaces of the container walls, one extremity of the tax stamp overlying said metal strip exteriorly of the container.

6. Fraud prevention means for taxable commodities adapted to be packed in a container comprising, in combination with a container having a slot in one of its walls, a ductile metal strip surrounding one of the articles and confining the same within the container, said strip being extended through said slot exteriorly of the container and having its extremities fixed to the container walls, and a tax stamp denoting the number of articles in the container upon which the tax has been paid, the said stamp being adhesively secured to the container walls and having a part overlying said metal strip whereby, in order to remove the article from the container, the destruction of the tax stamp and the prevention of its re-use is assured.

In testimony that I claim the foregoing as my invention, and I have signed my name hereunder.

LEON GREENSTEIN.